(12) United States Patent
Lin (10) Patent No.: US 11,853,090 B2
(45) Date of Patent: Dec. 26, 2023

(54) LOW-DROPOUT REGULATOR

(71) Applicant: Winbond Electronics Corp., Taichung (TW)

(72) Inventor: Chih-Feng Lin, Taichung (TW)

(73) Assignee: Winbond Electronics Corp., Taichung (TW)

( * ) Notice: Subject to any disclaimer, the term of this patent is extended or adjusted under 35 U.S.C. 154(b) by 99 days.

(21) Appl. No.: 17/386,562

(22) Filed: Jul. 28, 2021

(65) Prior Publication Data

US 2022/0066492 A1     Mar. 3, 2022

(30) Foreign Application Priority Data

Aug. 26, 2020    (TW) .................................. 109129104

(51) Int. Cl.
*G05F 1/575*     (2006.01)
*H02M 3/157*     (2006.01)

(52) U.S. Cl.
CPC ............ *G05F 1/575* (2013.01); *H02M 3/157* (2013.01)

(58) Field of Classification Search
CPC .......... G05F 1/462; G05F 1/465; G05F 1/468; G05F 1/56; G05F 1/575; G05F 1/562;
(Continued)

(56) References Cited

U.S. PATENT DOCUMENTS

| | | |
|---|---|---|
| 932,326 A | 8/1909 | Richardson |
| 6,201,375 B1 | 3/2001 | Larson et al. |

(Continued)

FOREIGN PATENT DOCUMENTS

| | | |
|---|---|---|
| CN | 104054246 | 9/2014 |
| CN | 102576686 | 4/2015 |

(Continued)

OTHER PUBLICATIONS

"Office Action of Taiwan Counterpart Application", dated Jun. 3, 2021, p. 1-p. 4.

(Continued)

*Primary Examiner* — Thienvu V Tran
*Assistant Examiner* — Nusrat Quddus
(74) *Attorney, Agent, or Firm* — JCIPRNET (57) ABSTRACT

A low-dropout regulator including a first comparator, an edge trigger, a second comparator, a third comparator, and an output stage circuit is provided. The first comparator generates a first comparison signal according to a first reference signal and an output signal. The edge trigger outputs a trigger signal according to the first comparison signal, a second comparison signal, and a third comparison signal. The second comparator generates the second comparison signal according to the output signal and a second reference signal. The third comparator generates the third comparison signal according to the output signal and a third reference signal. The output stage circuit outputs the output signal according to the first comparison signal, the second comparison signal, and the third comparison signal. The output stage circuit includes a plurality of hysteresis controllers and a plurality of power transistors. Each hysteresis controller controls a conduction state of a corresponding power transistor.

20 Claims, 8 Drawing Sheets

100

(58) Field of Classification Search
CPC .......... G05F 1/565; G05F 1/567; G05F 1/569; G05F 1/571; G05F 1/573; G05F 1/5735
See application file for complete search history.

(56) References Cited

U.S. PATENT DOCUMENTS

| | | | |
|---|---|---|---|
| 9,537,383 B1* | 1/2017 | Wibben | H02M 1/38 |
| 10,216,209 B1* | 2/2019 | Ham | G05F 1/575 |
| 10,250,139 B2 | 4/2019 | Wan et al. | |
| 10,389,224 B2 | 8/2019 | Huang | |
| 10,444,782 B1* | 10/2019 | Lin | H03K 19/20 |
| 11,099,591 B1* | 8/2021 | Köse | G05F 1/59 |
| 2007/0164715 A1 | 7/2007 | Zeng et al. | |
| 2008/0054867 A1* | 3/2008 | Soude | G05F 1/575 |
| | | | 323/282 |
| 2010/0156364 A1* | 6/2010 | Cho | G05F 1/565 |
| | | | 323/280 |
| 2010/0164453 A1* | 7/2010 | Bea | H02M 3/156 |
| | | | 323/282 |
| 2010/0164550 A1* | 7/2010 | Son | H03K 3/02337 |
| | | | 327/88 |
| 2014/0002041 A1* | 1/2014 | Soenen | G05F 1/575 |
| | | | 323/273 |
| 2014/0084881 A1* | 3/2014 | Shih | G05F 1/56 |
| | | | 323/269 |
| 2014/0309955 A1* | 10/2014 | Paul | G01R 21/00 |
| | | | 702/61 |
| 2015/0188408 A1* | 7/2015 | Huang | H02M 1/088 |
| | | | 323/272 |
| 2017/0212540 A1* | 7/2017 | Cho | H03K 5/1534 |
| 2020/0052700 A1 | 2/2020 | Seo et al. | |
| 2023/0130733 A1* | 4/2023 | Zhang | G05F 3/26 |
| | | | 323/274 |

FOREIGN PATENT DOCUMENTS

| | | | |
|---|---|---|---|
| CN | 104795993 | | 7/2015 |
| CN | 107977037 | | 5/2018 |
| CN | 108415502 | * | 8/2018 |
| CN | 109817251 | | 5/2019 |
| CN | 110045774 | * | 7/2019 |
| CN | 110196611 | | 9/2019 |
| CN | 111208858 A | * | 5/2020 |
| CN | 111555613 | * | 5/2021 |
| EP | 2897271 | | 7/2015 |
| EP | 3010131 | | 4/2016 |
| TW | 201118516 | | 6/2011 |
| WO | 2013085992 | | 6/2013 |
| WO | WO 2020204820 | * | 3/2019 |
| WO | 2020061786 | | 4/2020 |

OTHER PUBLICATIONS

"Office Action of China Counterpart Application", dated Nov. 16, 2022, p. 1-p. 6.

\* cited by examiner

LOW-DROPOUT REGULATOR

CROSS-REFERENCE TO RELATED APPLICATION

This application claims the priority benefit of Taiwan application serial no. 109129104, filed on Aug. 26, 2020. The entirety of the above-mentioned patent application is hereby incorporated by reference herein and made a part of this specification.

BACKGROUND OF THE INVENTION

Field of the Invention

The invention relates to a voltage regulator, and particularly relates to a low-dropout regulator (LDO).

Description of Related Art

As dynamic random-access memory (DRAM) specifications continue to evolve, the input voltage is getting lower, but the operating frequency is getting faster. Therefore, the response speed and output capability of the low-dropout regulator are becoming more important. Taking the current specifications as an example, because the input voltage and output voltage are very close, and the size of the drive circuit is very large, a digital low-dropout regulator (digital LDO) must be used, and because of the faster slew rate, a large current may be provided in a shorter time.

Since the switching signal generated by the digital low-dropout regulator is a full swing, if the power transistors frequently switch, the comparator will have a greater power consumption. Conversely, if the switching slew rate of the power transistors is slowed down, the output voltage will have a greater ripple.

SUMMARY OF THE INVENTION

The invention provides a low-dropout regulator that may reduce output ripple and reduce the power consumption of the comparator.

A low-dropout regulator of the invention includes a first comparator, an edge trigger, a second comparator, a third comparator, and an output stage circuit. The first comparator generates a first comparison signal according to a first reference signal and an output signal. The edge trigger outputs a trigger signal according to the first comparison signal, a second comparison signal, and a third comparison signal. The second comparator generates the second comparison signal according to the output signal and a second reference signal. The third comparator generates the third comparison signal according to the output signal and a third reference signal. The output stage circuit outputs the output signal according to the first comparison signal, the second comparison signal, and the third comparison signal. The output stage circuit includes a plurality of hysteresis controllers and a plurality of power transistors. Each of the hysteresis controllers is configured to control a conduction state of a corresponding power transistor.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In an embodiment of the invention, a power transistor segmented control is designed to solve the issue of switching the power transistor. Using three comparators and hysteresis controllers, the low-dropout regulator at different loading currents is made to only have one power transistor that is frequently switching. In this way, output ripple may be reduced and power consumption of the comparators may be reduced.

Figure 1:
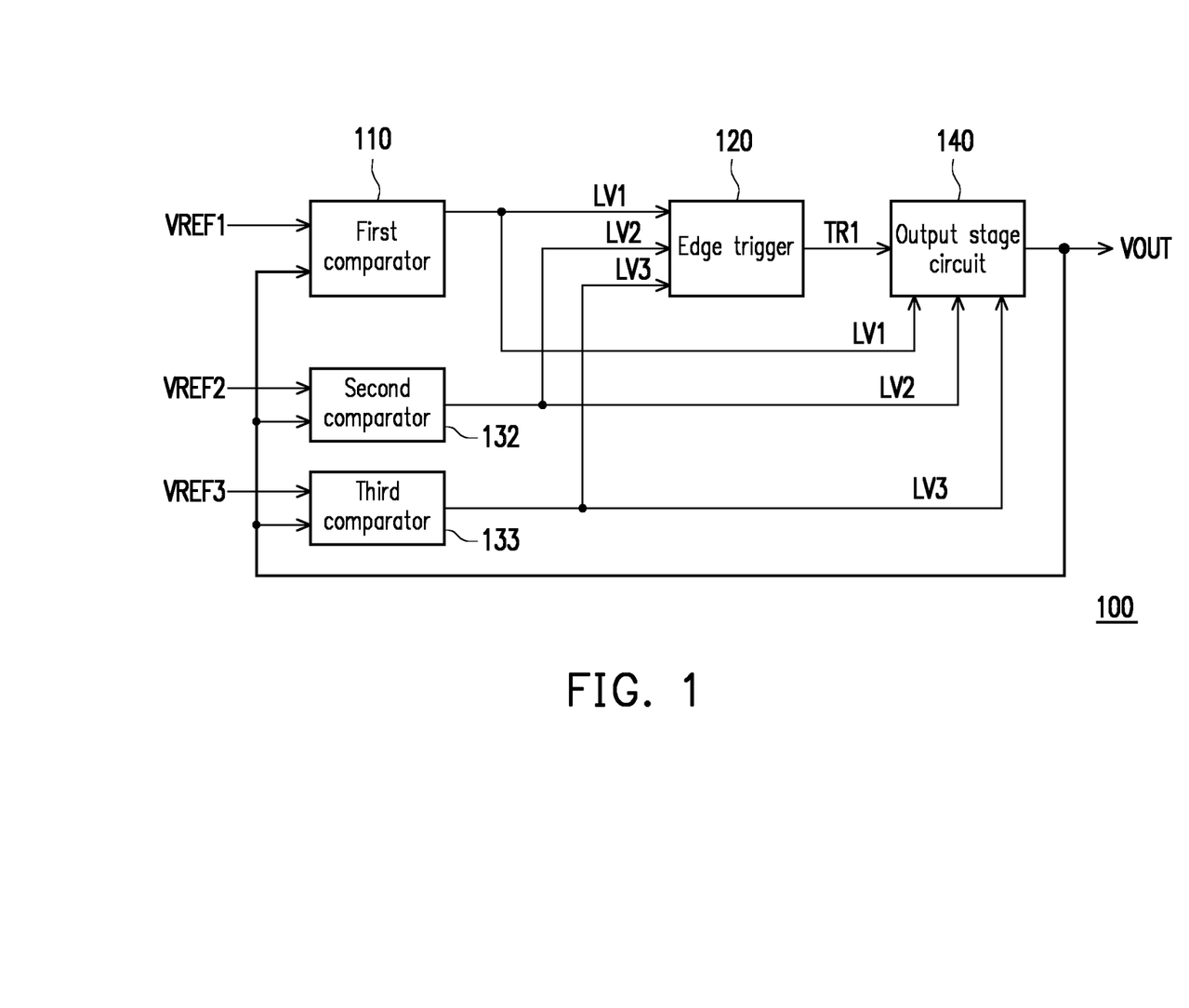
FIG. 1 shows a block diagram of a low-dropout regulator of an embodiment of the invention.

FIG. 1 shows a block diagram of a low-dropout regulator of an embodiment of the invention. Referring to FIG. 1, a low-dropout regulator 100 of the invention includes a first comparator 110, an edge trigger 120, a second comparator 132, a third comparator 133, and an output stage circuit 140. The edge trigger 120 is coupled between the first comparator 110 and the output stage circuit 140. The second comparator 132 and the third comparator 133 are coupled to the edge trigger 120 and the output stage circuit 140.

The first comparator 110 is configured to generate a first comparison signal LV1 according to a first reference signal VREF1 and an output signal VOUT, and output the first comparison signal LV1 to the edge trigger 120 and the output stage circuit 140. The second comparator 132 is configured to generate a second comparison signal LV2 according to the output signal VOUT and a second reference signal VREF2, and output the second comparison signal LV2 to the edge trigger 120 and the output stage circuit 140. The third comparator 133 is configured to generate a third comparison signal LV3 according to the output signal VOUT and a third reference signal VREF3, and output the third comparison signal LV3 to the edge trigger 120 and the output stage circuit 140.

The edge trigger 120 is configured to output a trigger signal TR1 to the output stage circuit 140 according to the first comparison signal LV1, the second comparison signal LV2, and the third comparison signal LV3 to disable or enable the operation of the output stage circuit 140. The output stage circuit 140 is configured to output the output signal VOUT to the first comparator 110, the second comparator 132, and the third comparator 133 according to the first comparison signal LV1, the second comparison signal LV2, and the third comparison signal LV3.

Figure 2:
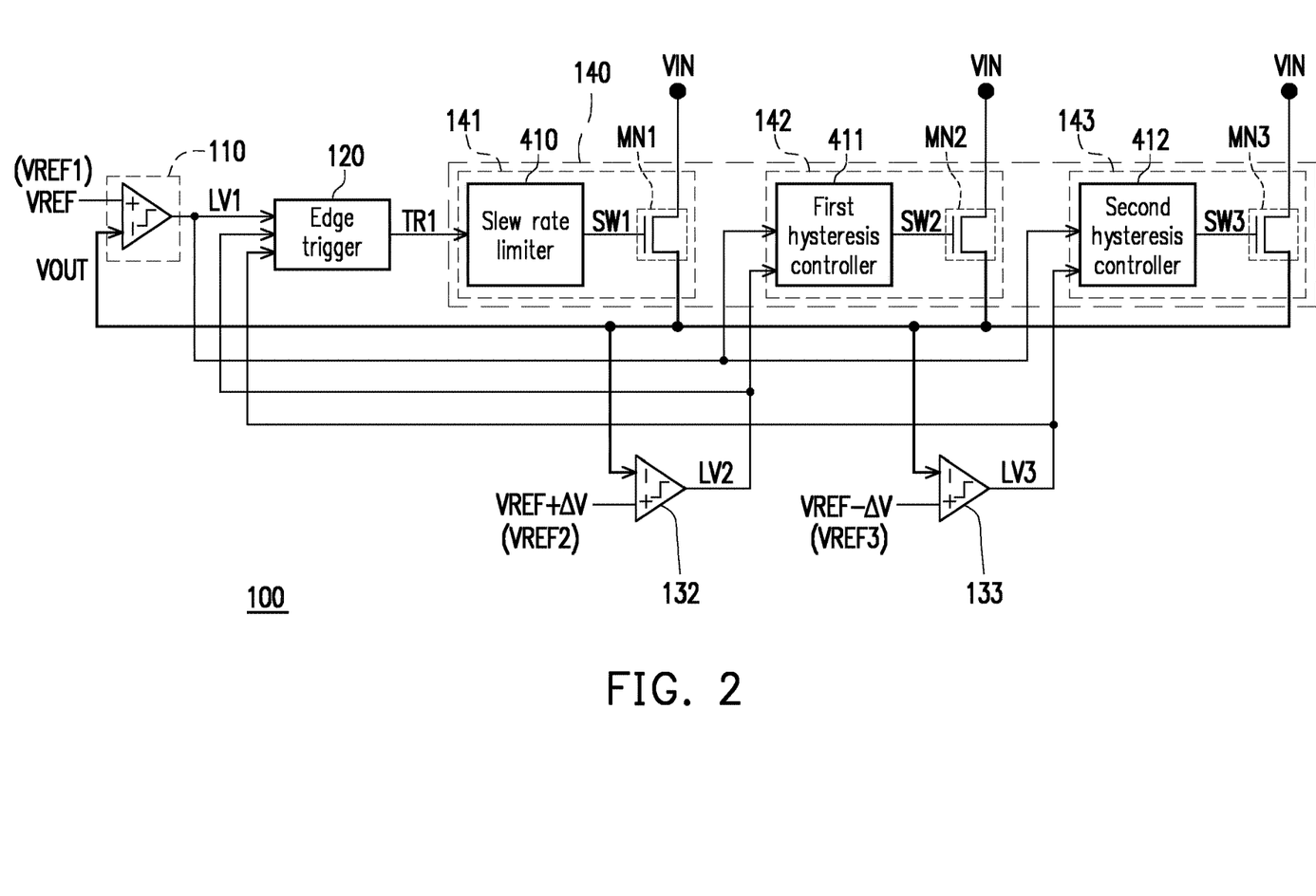
FIG. 2 shows a circuit diagram of the low-dropout regulator of the embodiment of FIG. 1.

FIG. 2 shows a circuit diagram of the low-dropout regulator of the embodiment of FIG. 1. Please refer to FIG. 2, the first comparator 110 includes an inverting input terminal, a non-inverting input terminal, and an output terminal. The inverting input terminal receives the output signal VOUT, the non-inverting input terminal receives the first reference signal VREF1, and the output terminal outputs the first comparison signal LV1. The second comparator 132 includes an inverting input terminal, a non-inverting input terminal, and an output terminal. The inverting input terminal receives the output signal VOUT, the non-inverting input terminal receives the second reference signal VREF2, and the output terminal outputs the second comparison signal LV2. The third comparator 133 includes an inverting input terminal, a non-inverting input terminal, and an output terminal. The inverting input terminal receives the output signal VOUT, the non-inverting input terminal receives the third reference signal VREF3, and the output terminal outputs the third comparison signal LV3.

In the present embodiment, the first reference signal VREF1, the second reference signal VREF2, and the third reference signal VREF3 may be generated by a signal generating circuit (not shown). In an embodiment, the second reference signal VREF2 is greater than the first reference signal VREF1, and the first reference signal VREF1 is greater than the third reference signal VREF3. For example, the first reference signal VREF1 is, for example, the reference signal VREF, the second reference signal VREF2 is, for example, a reference signal VREF+$\Delta$V, and the third reference signal VREF3 is, for example, a reference signal VREF−$\Delta$V.

The output stage circuit 140 includes a first output stage 141, a second output stage 142, and a third output stage 143. The first output stage 141 is coupled to the edge trigger 120. The second output stage 142 is coupled to the first output stage 141. The third output stage 143 is coupled to the second output stage 142.

The first output stage 141 is configured to receive an input signal VIN. The first output stage 141 outputs the output signal VOUT to the first comparator 110, the second comparator 132, and the third comparator 133 according to the trigger signal TR1.

Specifically, the first output stage 141 includes a first power transistor MN1 and a slew rate limiter 410. The slew rate limiter 410 is coupled between the edge trigger 120 and the first power transistor MN1. The slew rate limiter 410 outputs a first switching signal SW1 to the control terminal of the first power transistor MN1 according to the trigger signal TR1 to adjust the slew rate of the first power transistor MN1. The first power transistor MN1 includes a first terminal, a second terminal, and a control terminal. The first terminal receives the input signal VIN, the second terminal outputs the output signal VOUT to the first comparator 110, the second comparator 132, and the third comparator 133, and the control terminal receives the first switching signal SW1.

The second output stage 142 is configured to receive the input signal VIN. The second output stage 142 outputs the output signal VOUT to the first comparator 110, the second comparator 132, and the third comparator 133 according to the first comparison signal LV1 and the second comparison signal LV2.

Specifically, the second output stage 142 includes a second power transistor MN2 and a first hysteresis controller 411. The first hysteresis controller 411 is coupled to the second power transistor MN2. The first hysteresis controller 411 outputs a second switching signal SW2 to the control terminal of the second power transistor MN2 according to the first comparison signal LV1 and the second comparison signal LV2 to control the conduction state of the second power transistor MN2. The second power transistor MN2 includes a first terminal, a second terminal, and a control terminal. The first terminal receives the input signal VIN, the second terminal outputs the output signal VOUT to the first comparator 110, the second comparator 132, and the third comparator 133, and the control terminal receives the second switching signal SW2.

The third output stage 143 is configured to receive the input signal VIN. The third output stage 143 outputs the output signal VOUT to the first comparator 110, the second comparator 132, and the third comparator 133 according to the first comparison signal LV1 and the third comparison signal LV3.

Specifically, the third output stage 143 includes a third power transistor MN3 and a second hysteresis controller 412. The second hysteresis controller 412 is coupled to the third power transistor MN3. The second hysteresis controller 412 outputs a third switching signal SW3 to the control terminal of the third power transistor MN3 according to the first comparison signal LV1 and the third comparison signal LV3 to control the conduction state of the third power transistor MN3. The third power transistor MN3 includes a first terminal, a second terminal, and a control terminal. The first terminal receives the input signal VIN, the second terminal outputs the output signal VOUT to the first comparator 110, the second comparator 132, and the third comparator 133, and the control terminal receives the third switching signal SW3.

In the present embodiment, sufficient teaching, suggestion, and implementation of the circuit structures and operation methods of the edge trigger 120, the slew rate limiter 410, the first hysteresis controller 411, and the second hysteresis controller 412 may be obtained from common knowledge in the art.

Figure 3:
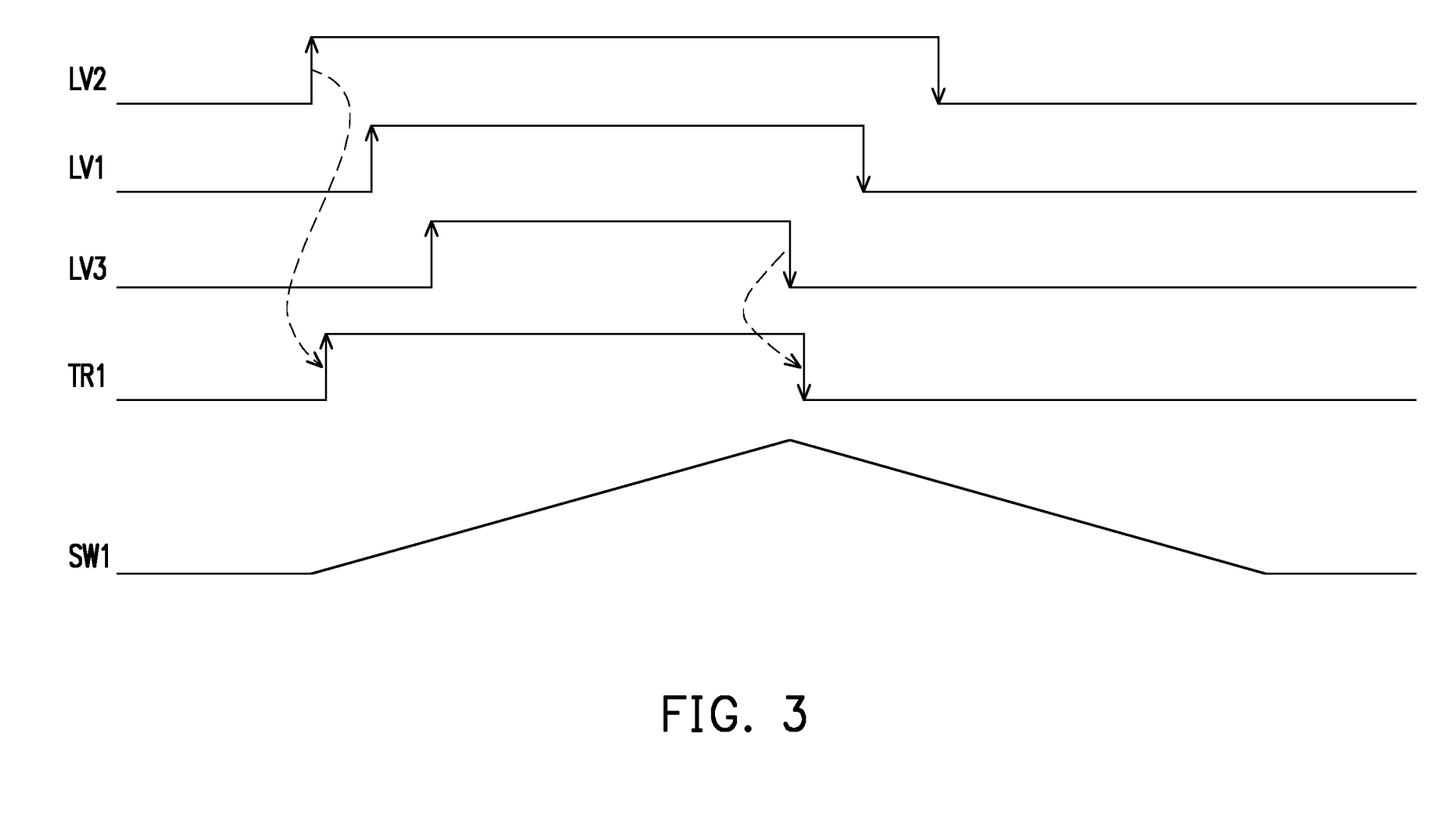
FIG. 3 shows a diagram of the waveforms of a comparison signal, a trigger signal, and a switching signal when an edge trigger and a slew rate limiter of an embodiment of the invention are operated.

FIG. 3 shows a diagram of the waveforms of a comparison signal, a trigger signal, and a switching signal when an edge trigger and a slew rate limiter of an embodiment of the invention are operated. Referring to FIG. 2 and FIG. 3, the edge trigger 120 of the present embodiment receives the first comparison signal LV1, the second comparison signal LV2, and the third comparison signal LV3. The edge trigger 120 outputs the trigger signal TR1 to the slew rate limiter 410 according to the first comparison signal LV1, the second comparison signal LV2, and the third comparison signal LV3 to disable or enable the operation of the slew rate limiter 410.

For example, when the rising edge of any of the first comparison signal LV1, the second comparison signal LV2, and the third comparison signal LV3 is received (in this example, the edge trigger 120 first receives the rising edge of the second comparison signal LV2), the edge trigger 120 outputs a high-level (first-level) trigger signal TR1 to the slew rate limiter 410 to trigger the operation thereof. The slew rate limiter 410 may slow down the pull-high speed of the first switching signal SW1 after being enabled. Therefore, when the rising edge of any of the first comparison signal LV1, the second comparison signal LV2, and the third comparison signal LV3 is received, the first power transistor MN1 is turned on.

When the falling edge of any of the first comparison signal LV1, the second comparison signal LV2, and the third comparison signal LV3 is received (in this example, the edge trigger 120 first receives the falling edge of the third comparison signal LV3), the edge trigger 120 outputs a low-level (second-level) trigger signal TR1 to the slew rate limiter 410 to stop the operation thereof. After the slew rate limiter 410 is disabled, the first switching signal SW1 is gradually pulled-low. Therefore, when the falling edge of any of the first comparison signal LV1, the second comparison signal LV2, and the third comparison signal LV3 is received, the first power transistor MN1 is turned off.

Figure 4:
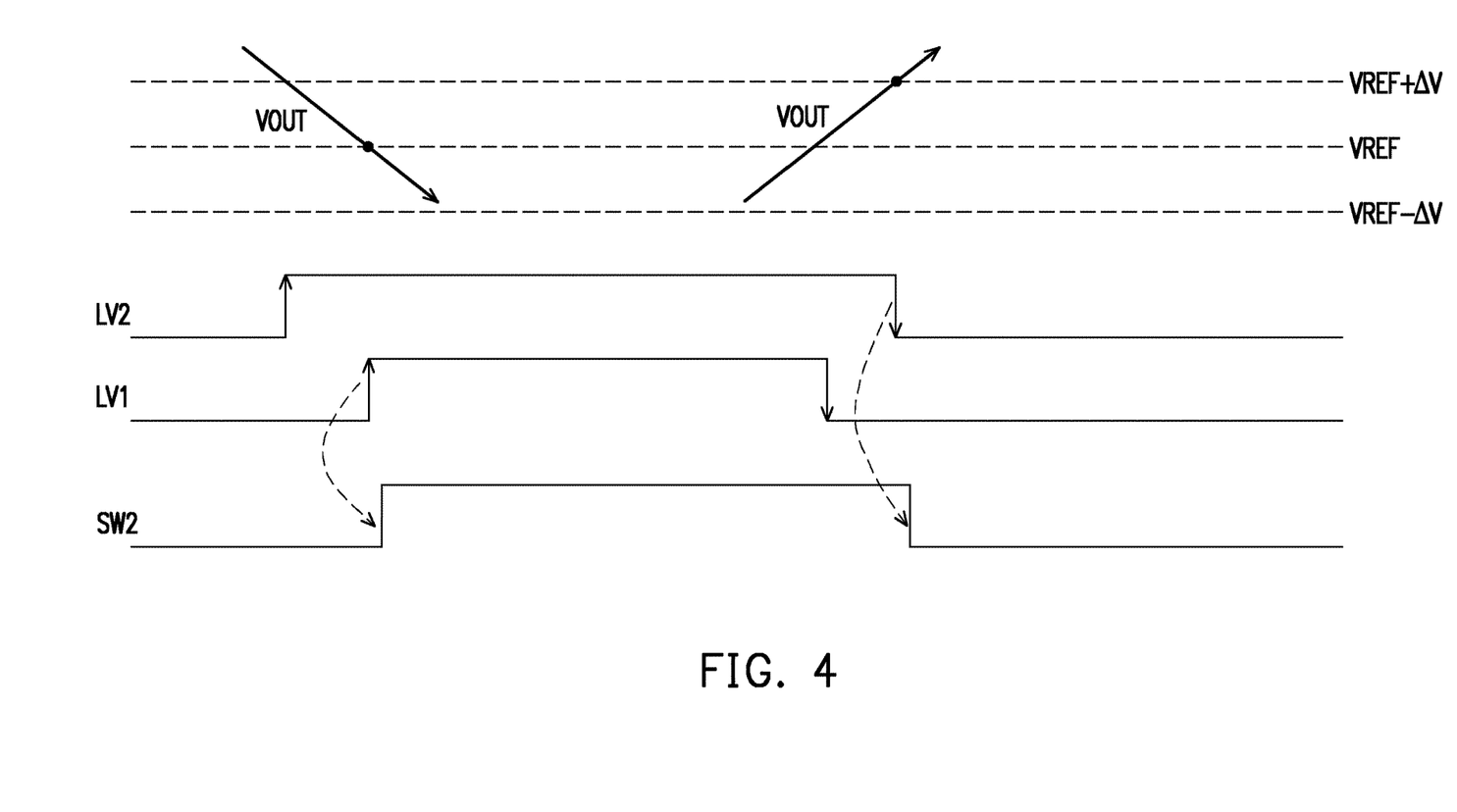
FIG. 4 shows a diagram of the waveforms of a comparison signal and a switching signal when a first hysteresis controller of an embodiment of the invention is operated.

FIG. 4 shows a diagram of the waveforms of a comparison signal and a switching signal when a first hysteresis controller of an embodiment of the invention is operated. Referring to FIG. 2 and FIG. 4, the first hysteresis controller 411 of the present embodiment receives the first comparison signal LV1 and the second comparison signal LV2. The first hysteresis controller 411 outputs the second switching signal SW2 to the control terminal of the second power transistor MN2 according to the first comparison signal LV1 and the second comparison signal LV2 to control the conduction state of the second power transistor MN2.

For example, when the output signal VOUT is less than or equal to the first reference signal VREF, the first comparator 110 outputs a high-level first comparison signal LV1. When the rising edge of the first comparison signal LV1 is received, the first hysteresis controller 411 outputs a high-level second switching signal SW2 to the second power transistor MN2 to turn it on. When the output signal VOUT is greater than the second reference signal VREF+$\Delta$V, the second comparator 132 outputs a low-level second comparison signal LV2. When the falling edge of the second comparison signal LV2 is received, the first hysteresis controller 411 outputs a low-level second switching signal SW2 to the second power transistor MN2 to turn it off.

Figure 5:
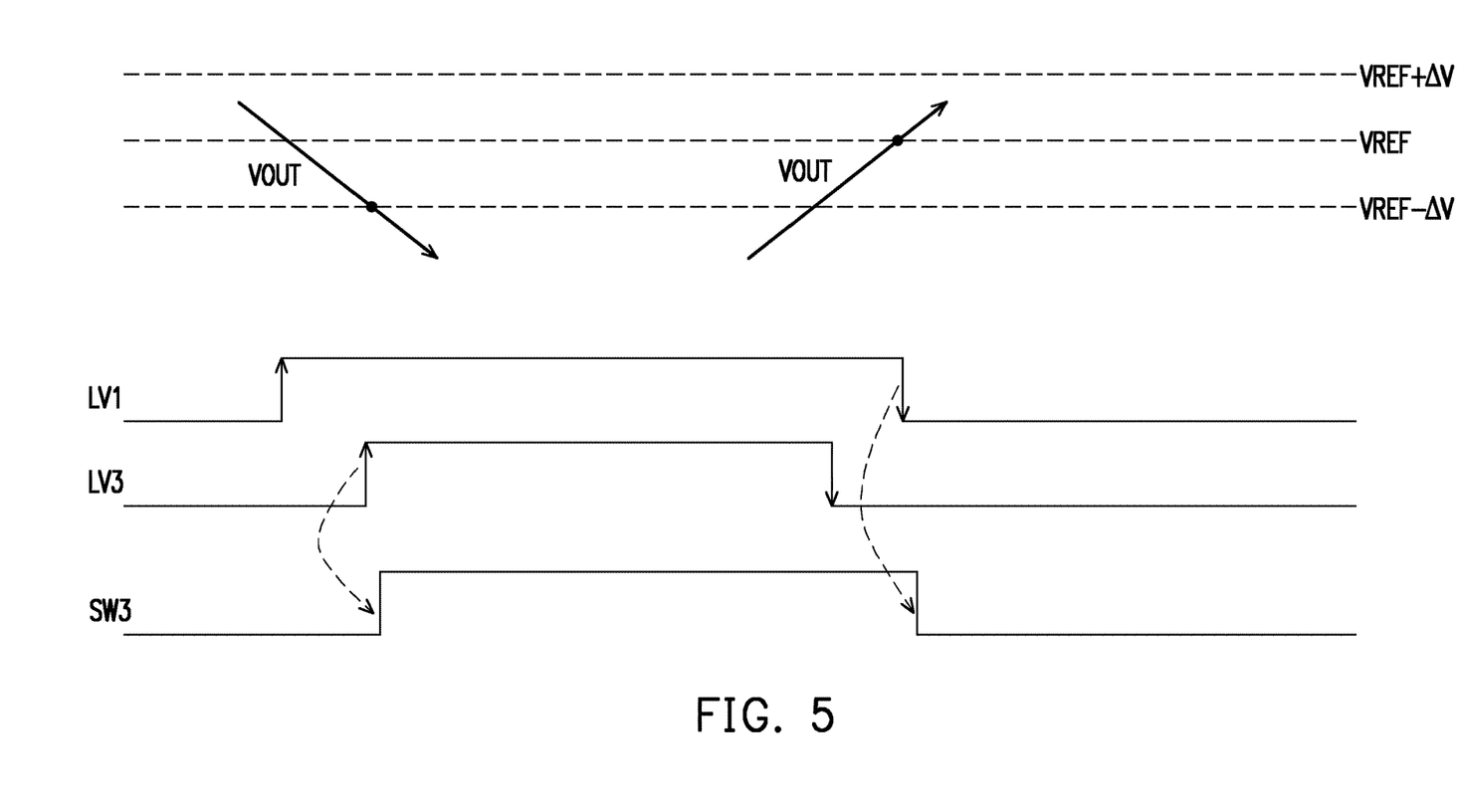
FIG. 5 shows a diagram of the waveforms of a comparison signal and a switching signal when a second hysteresis controller of an embodiment of the invention is operated.

FIG. 5 shows a diagram of the waveforms of a comparison signal and a switching signal when a second hysteresis controller of an embodiment of the invention is operated. Referring to FIG. 2 and FIG. 5, the second hysteresis controller 412 of the present embodiment receives the first comparison signal LV1 and the third comparison signal LV3. The second hysteresis controller 412 outputs a third switching signal SW3 to the control terminal of the third power transistor MN3 according to the first comparison signal LV1 and the third comparison signal LV3 to control the conduction state of the third power transistor MN3.

For example, when the output signal VOUT is less than or equal to the third reference signal VREF−$\Delta$V, the third comparator 133 outputs a high-level third comparison signal LV3. When the rising edge of the third comparison signal LV3 is received, the second hysteresis controller 412 outputs a high-level third switching signal SW3 to the third power transistor MN3 to turn it on. When the output signal VOUT is greater than the first reference signal VREF, the first comparator 110 outputs a low-level first comparison signal LV1. When the falling edge of the first comparison signal LV1 is received, the second hysteresis controller 412 outputs a low-level third switching signal SW3 to the third power transistor MN3 to turn it off.

The operation method and the waveform change of the output signal of the low-dropout regulator of an embodiment of the invention when operated at light loading, middle loading, and heavy loading are described below.

Figure 6:
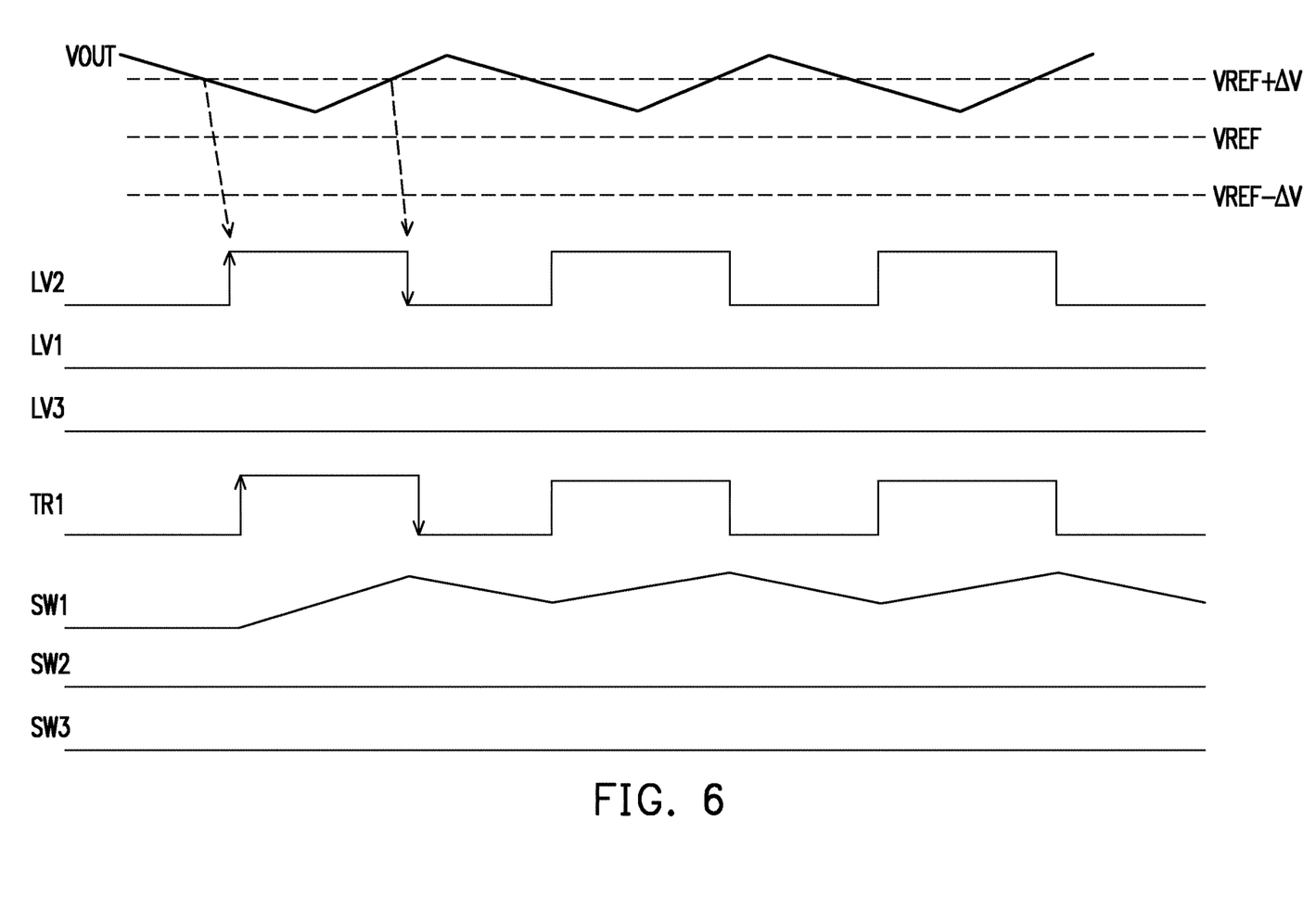
FIG. 6 shows a diagram of the waveforms of a comparison signal, a switching signal, and an output signal when a low-dropout regulator of an embodiment of the invention is operated at light loading.

FIG. 6 shows a diagram of the waveforms of a comparison signal, a switching signal, and an output signal when a low-dropout regulator of an embodiment of the invention is operated at light loading. Please refer to FIG. 2 and FIG. 6, when the low-dropout regulator 100 is operated at light loading (that is, the loading current is less), the output signal VOUT thereof is mainly changed based on the second reference signal VREF+$\Delta$V. In the present embodiment, the second comparator 132 compares the magnitudes of the second reference signal VREF+$\Delta$V and the output signal VOUT. When the output signal VOUT is less than or equal to the second reference signal VREF+$\Delta$V, the second comparator 132 outputs a high-level second comparison signal LV2. When the output signal VOUT is greater than the second reference signal VREF+$\Delta$V, the second comparator 132 outputs a low-level second comparison signal LV2.

The edge trigger 120 outputs a high-level trigger signal TR1 to the output stage circuit 140 according to the rising edge of the second comparison signal LV2 to enable the operation of the slew rate limiter 410, so that the first power transistor MN1 is turned on. Next, the edge trigger 120 outputs a low-level trigger signal TR1 to the output stage circuit 140 according to the falling edge of the second comparison signal LV2 to disable to operation of the slew rate limiter 410, so that the first power transistor MN1 is turned off. Refer to FIG. 3 for the operation of the edge trigger 120 and the slew rate limiter 410. Therefore, in the present embodiment, the first power transistor MN1 is kept at the switching state, and the ripple of the output signal VOUT is small.

In addition, in the present embodiment, the second power transistor MN2 and the third power transistor MN3 are kept at an off state. Therefore, in the present embodiment, if the loading current is less, that is, the output signal VOUT is less than or equal to the second reference signal VREF+$\Delta$V, the first power transistor MN1 is slowly turned on and off, and the second power transistor MN2 and the third power transistor MN3 remain off.

Figure 7:
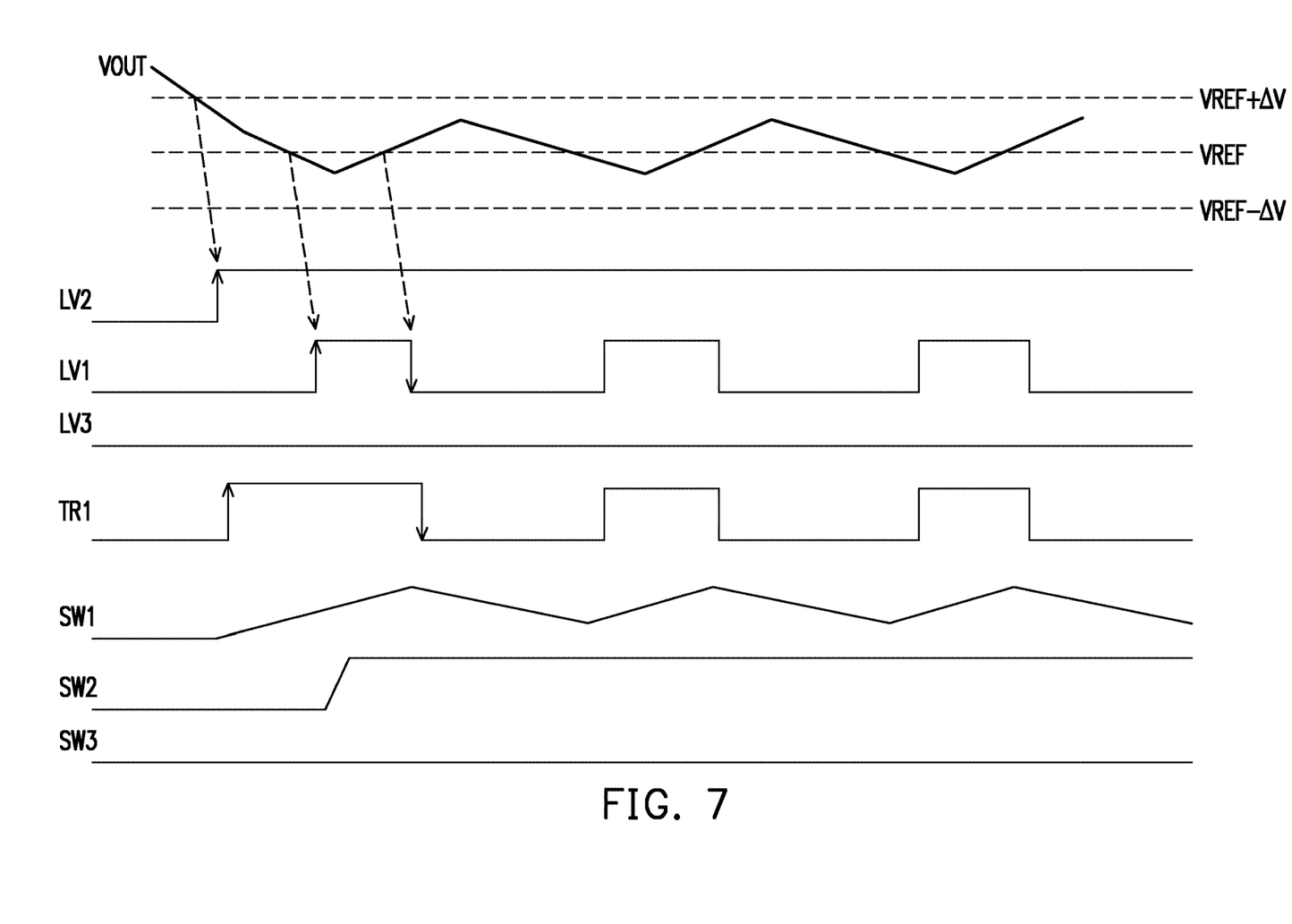
FIG. 7 shows a diagram of the waveforms of a comparison signal, a switching signal, and an output signal when a low-dropout regulator of an embodiment of the invention is operated at middle loading.

FIG. 7 shows a diagram of the waveforms of a comparison signal, a switching signal, and an output signal when a low-dropout regulator of an embodiment of the invention is operated at middle loading. Please refer to FIG. 2 and FIG. 7, when the low-dropout regulator 100 is operated at middle loading (that is, the loading current is medium), the output signal VOUT thereof is mainly changed based on the first reference signal VREF. In the present embodiment, the first comparator 110 compares the magnitudes of the first reference signal VREF and the output signal VOUT. When the output signal VOUT is less than or equal to the first reference signal VREF, the first comparator 110 outputs a high-level first comparison signal LV1. When the output signal VOUT is greater than the first reference signal VREF, the first comparator 110 outputs a low-level first comparison signal LV1. Moreover, in the present embodiment, since the output signal VOUT is less than the second reference signal VREF+$\Delta$V, the second comparator 132 outputs a high-level second comparison signal LV2, and the second comparison signal LV2 continues to be at a high-level state.

The edge trigger 120 outputs a high-level trigger signal TR1 to the output stage circuit 140 according to the rising edge of the second comparison signal LV2 to enable the operation of the slew rate limiter 410, so that the first power transistor MN1 is turned on. Next, the edge trigger 120 outputs a low-level trigger signal TR1 to the output stage circuit 140 according to the falling edge of the first comparison signal LV1 to disable to operation of the slew rate limiter 410, so that the first power transistor MN1 is turned off. Refer to FIG. 3 for the operation of the edge trigger 120 and the slew rate limiter 410. Therefore, in the present embodiment, the first power transistor MN1 is kept at the switching state, and the ripple of the output signal VOUT is small.

In addition, since the second comparison signal LV2 is continuously at a high-level state, the second power transistor MN2 is kept at an on state, and the operation thereof is as provided in FIG. 4. In addition, in the present embodiment, the third power transistor MN3 is kept at an off state. Therefore, in the present embodiment, if the loading current is medium, that is, the output signal VOUT is less than or equal to the first reference signal VREF, the first power transistor MN1 is slowly turned on and off, the second power transistor MN2 is turned on quickly and maintains the on state, and the third power transistor MN3 remains off.

Figure 8:
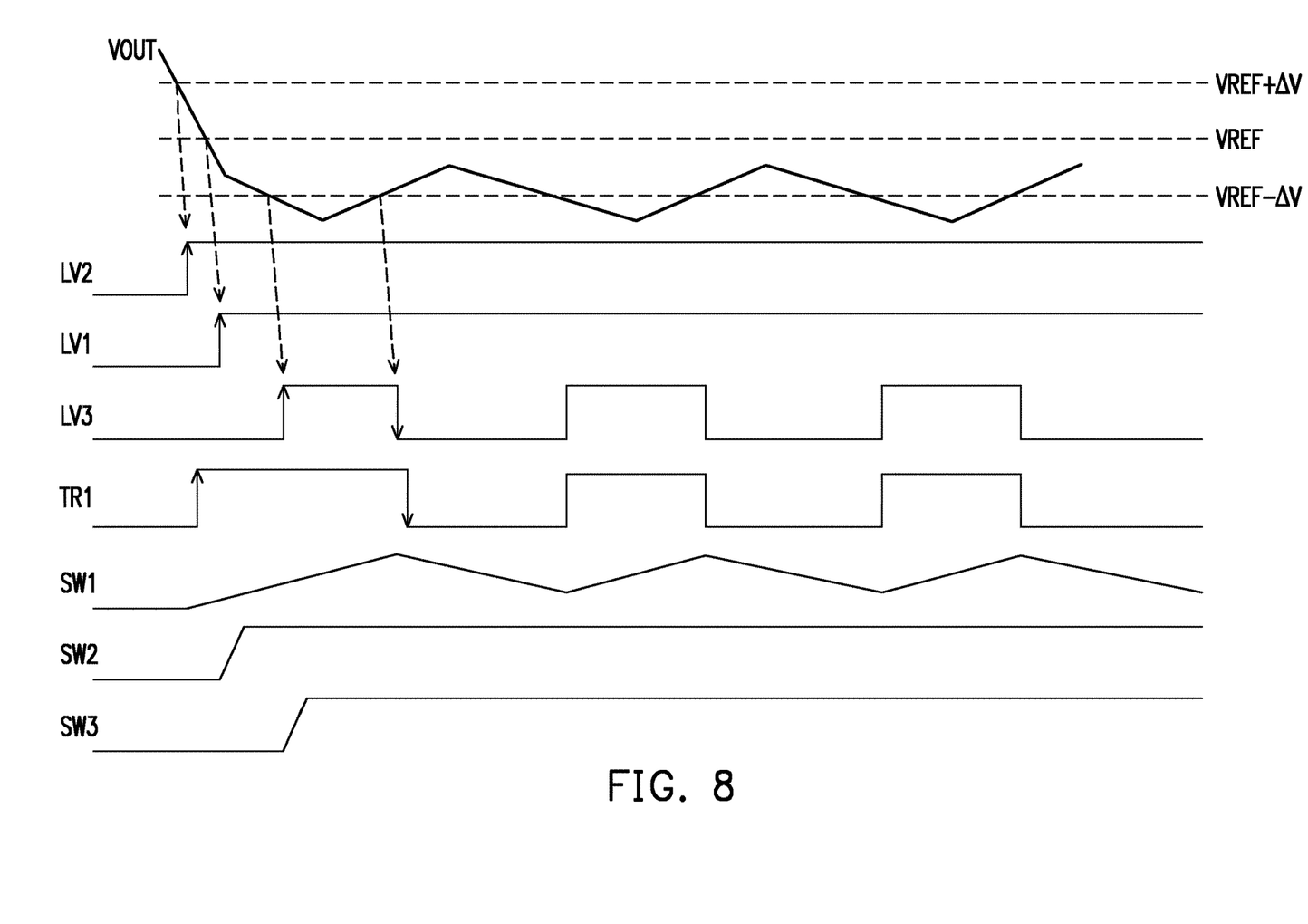
FIG. 8 shows a diagram of the waveforms of a comparison signal, a switching signal, and an output signal when a low-dropout regulator of an embodiment of the invention is operated at heavy loading.

FIG. 8 shows a diagram of the waveforms of a comparison signal, a switching signal, and an output signal when a low-dropout regulator of an embodiment of the invention is operated at heavy loading. Please refer to FIG. 2 and FIG. 8, when the low-dropout regulator 100 is operated at heavy loading (that is, the loading current is greater), the output signal VOUT thereof is mainly changed based on the third reference signal VREF−ΔV. In the present embodiment, the third comparator 133 compares the magnitudes of the third reference signal VREF−ΔV and the output signal VOUT. When the output signal VOUT is less than or equal to the third reference signal VREF−ΔV, the third comparator 133 outputs a high-level third comparison signal LV3. When the output signal VOUT is greater than the third reference signal VREF−ΔV, the third comparator 133 outputs a low-level third comparison signal LV3. Moreover, in the present embodiment, since the output signal VOUT is less than the first reference signal VREF and the second reference signal VREF+ΔV, the second comparator 132 outputs a high-level second comparison signal LV2, the first comparator 110 outputs a high-level first comparison signal LV1, and both the first comparison signal LV1 and the second comparison signal LV2 are continuously at a high-level state.

The edge trigger 120 outputs a high-level trigger signal TR1 to the output stage circuit 140 according to the rising edge of the second comparison signal LV2 to enable the operation of the slew rate limiter 410, so that the first power transistor MN1 is turned on. Next, the edge trigger 120 outputs a low-level trigger signal TR1 to the output stage circuit 140 according to the falling edge of the third comparison signal LV3 to disable to operation of the slew rate limiter 410, so that the first power transistor MN1 is turned off. Refer to FIG. 3 for the operation of the edge trigger 120 and the slew rate limiter 410. Therefore, in the present embodiment, the first power transistor MN1 is kept at the switching state, and the ripple of the output signal VOUT is small.

In addition, since the second comparison signal LV2 and the first comparison signal LV1 are continuously at a high-level state, the second power transistor MN2 and the third power transistor MN3 are kept at an on state. Refer to FIG. 4 and FIG. 5 respectively for the operations thereof. Therefore, in the present embodiment, if the loading current is greater, that is, the output signal VOUT is less than or equal to the third reference signal VREF−ΔV, the first power transistor MN1 is slowly turned on and off at this time, and the second power transistor MN2 and the third power transistor MN3 are turned on quickly and maintained at an on state.

Based on the above, in an embodiment of the invention, the low-dropout regulator uses a plurality of comparators with a plurality of reference signals to generate three trigger intervals, and then uses this information to control the power transistors so that the power transistors may be turned on in stages and to reduce the number of frequently turned on power transistors. In addition, the low-dropout regulator further includes a slew rate limiter and hysteresis controllers to further reduce the rate of change of the output current of the power transistors. The slew rate limiter is configured to control the first power transistor, and the hysteresis controllers are configured to control the second power transistor and the third power transistor. Via the control method of an embodiment of the invention, regardless of the loading current, only the first power transistor is frequently turned on and off, so the ripple is less and the power consumption is also less.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A low-dropout regulator, comprising:
   a first comparator configured to generate a first comparison signal according to a first reference signal and an output signal;
   an edge trigger coupled to the first comparator and configured to output a trigger signal according to the first comparison signal, a second comparison signal, and a third comparison signal;
   a second comparator coupled to the edge trigger and configured to generate the second comparison signal according to the output signal and a second reference signal;
   a third comparator coupled to the edge trigger and configured to generate the third comparison signal according to the output signal and a third reference signal; and
   an output stage circuit coupled to the edge trigger, the second comparator, and the third comparator and configured to output the output signal according to the first comparison signal, the second comparison signal, and the third comparison signal, wherein the output stage circuit comprises a plurality of hysteresis controllers and a plurality of power transistors, and each of the hysteresis controllers is configured to control a conduction state of a corresponding power transistor,
   wherein output stage circuit comprises a slew rate limiter, wherein the slew rate limiter is coupled between the edge trigger and a first power transistor of the plurality of power transistors, and is configured to output a first switching signal to the control terminal of the first power transistor according to the trigger signal to adjust a slew rate of the first power transistor,
   wherein the edge trigger receives a falling edge of the third comparison signal, and the slew rate limiter is disabled so that the first switching signal is gradually pulled down.

2. The low-dropout regulator of claim 1, wherein the output stage circuit comprises a first output stage coupled to the edge trigger, and the first output stage is configured to receive an input signal and output the output signal according to the trigger signal.

3. The low-dropout regulator of claim 2, wherein the first output stage comprises:
   the first power transistor comprising a first terminal, a second terminal, and a control terminal, wherein the first terminal receives the input signal, the second terminal outputs the output signal to the first comparator, the second comparator, and the third comparator, and the power transistors comprise the first power transistor.

4. The low-dropout regulator of claim 3, wherein
when the edge trigger receives a rising edge of any of the first comparison signal, the second comparison signal, and the third comparison signal, the edge trigger outputs the trigger signal at a first level to enable an operation of the slew rate limiter, and the slew rate limiter turns on the first power transistor; and
when the edge trigger receives a falling edge of any of the first comparison signal, the second comparison signal, and the third comparison signal, the edge trigger outputs the trigger signal at a second level to disable an operation of the slew rate limiter, and the slew rate limiter turns off the first power transistor.

5. The low-dropout regulator of claim 4, wherein
the edge trigger receives a rising edge of the second comparison signal, and the slew rate limiter is enabled to slow a pull-up speed of the first switching signal.

6. The low-dropout regulator of claim 2, wherein the output stage circuit comprises a second output stage coupled to the first output stage, and the second output stage is configured to receive the input signal and output the output signal according to the first comparison signal and the second comparison signal.

7. The low-dropout regulator of claim 6, wherein the second output stage comprises:
a second power transistor comprising a first terminal, a second terminal, and a control terminal, wherein the first terminal receives the input signal, the second terminal outputs the output signal to the first comparator, the second comparator, and the third comparator, and the power transistors comprise the second power transistor; and
a first hysteresis controller coupled to the second power transistor and configured to output a second switching signal to the control terminal of the second power transistor according to the first comparison signal and the second comparison signal to control a conduction state of the second power transistor, and the hysteresis controllers comprise the first hysteresis controller.

8. The low-dropout regulator of claim 7, wherein
when the first hysteresis controller receives a rising edge of the first comparison signal or a rising edge of the second comparison signal, the first hysteresis controller outputs the second switching signal at the first level so that the second power transistor is turned on; and
when the first hysteresis controller receives a falling edge of the first comparison signal or a falling edge of the second comparison signal, the first hysteresis controller outputs the second switching signal at the second level so that the second power transistor is turned off.

9. The low-dropout regulator of claim 8, wherein
when the output signal is less than or equal to the first reference signal, the first comparator outputs the first comparison signal at the first level, and when the first hysteresis controller receives a rising edge of the first comparison signal, the first hysteresis controller outputs the second switching signal at the first level to turn on the second power transistor; and
when the output signal is greater than the second reference signal, the second comparator outputs the second comparison signal at the second level, when the first hysteresis controller receives a falling edge of the second comparison signal, the first hysteresis controller outputs the second switching signal at the second level so that the second power transistor is turned off, and the second reference signal is greater than the first reference signal.

10. The low-dropout regulator of claim 6, wherein the output stage circuit comprises a third output stage coupled to the second output stage, and the third output stage is configured to receive the input signal and output the output signal according to the first comparison signal and the third comparison signal.

11. The low-dropout regulator of claim 10, wherein the third output stage comprises:
a third power transistor comprising a first terminal, a second terminal, and a control terminal, wherein the first terminal receives the input signal, the second terminal outputs the output signal to the first comparator, the second comparator, and the third comparator, and the power transistors comprise the third power transistor; and
a second hysteresis controller coupled to the third power transistor and configured to output a third switching signal to the control terminal of the third power transistor according to the first comparison signal and the third comparison signal to control a conduction state of the third power transistor, and the hysteresis controllers comprise the second hysteresis controller.

12. The low-dropout regulator of claim 11, wherein
when the second hysteresis controller receives a rising edge of the first comparison signal or a rising edge of the third comparison signal, the second hysteresis controller outputs the third switching signal at the first level so that the third power transistor is turned on; and
when the second hysteresis controller receives a falling edge of the first comparison signal or a falling edge of the third comparison signal, the second hysteresis controller outputs the third switching signal at the second level so that the third power transistor is turned off.

13. The low-dropout regulator of claim 12, wherein
when the output signal is less than or equal to the third reference signal, the third comparator outputs the third comparison signal at the first level, and when the second hysteresis controller receives a rising edge of the third comparison signal, the second hysteresis controller outputs the third switching signal at the first level to turn on the third power transistor; and
when the output signal is greater than the first reference signal, the first comparator outputs the first comparison signal at the second level, when the second hysteresis controller receives a falling edge of the first comparison signal, the second hysteresis controller outputs the third switching signal at the second level so that the third power transistor is turned off, and the first reference signal is greater than the third reference signal.

14. A low-dropout regulator, comprising:
a first comparator configured to generate a first comparison signal according to a first reference signal and an output signal;
an edge trigger coupled to the first comparator and configured to output a trigger signal according to the first comparison signal, a second comparison signal, and a third comparison signal;
a second comparator coupled to the edge trigger and configured to generate the second comparison signal according to the output signal and a second reference signal;

a third comparator coupled to the edge trigger and configured to generate the third comparison signal according to the output signal and a third reference signal; and an output stage circuit coupled to the edge trigger, the second comparator, and the third comparator and configured to output the output signal according to the first comparison signal, the second comparison signal, and the third comparison signal, wherein the output stage circuit comprises a plurality of hysteresis controllers and a plurality of power transistors, and each of the hysteresis controllers is configured to control a conduction state of a corresponding power transistor, wherein the output stage circuit comprises a first output stage coupled to the edge trigger and a second output stage coupled to the first output stage, wherein the second output stage comprises:

a second power transistor comprising a first terminal, a second terminal, and a control terminal, wherein the first terminal receives an input signal, the second terminal outputs the output signal to the first comparator, the second comparator, and the third comparator, and the power transistors comprise the second power transistor; and a first hysteresis controller coupled to the second power transistor and configured to output a second switching signal to the control terminal of the second power transistor according to the first comparison signal and the second comparison signal to control a conduction state of the second power transistor, and the hysteresis controllers comprise the first hysteresis controller.

15. The low-dropout regulator of claim 14, wherein
when the first hysteresis controller receives a rising edge of the first comparison signal or a rising edge of the second comparison signal, the first hysteresis controller outputs the second switching signal at the first level so that the second power transistor is turned on; and
when the first hysteresis controller receives a falling edge of the first comparison signal or a falling edge of the second comparison signal, the first hysteresis controller outputs the second switching signal at the second level so that the second power transistor is turned off.

16. The low-dropout regulator of claim 15, wherein
when the output signal is less than or equal to the first reference signal, the first comparator outputs the first comparison signal at a first level, and when the first hysteresis controller receives a rising edge of the first comparison signal, the first hysteresis controller outputs the second switching signal at the first level to turn on the second power transistor; and
when the output signal is greater than the second reference signal, the second comparator outputs the second comparison signal at a second level, when the first hysteresis controller receives a falling edge of the second comparison signal, the first hysteresis controller outputs the second switching signal at the second level so that the second power transistor is turned off, and the second reference signal is greater than the first reference signal.

17. The low-dropout regulator of claim 14, wherein the output stage circuit comprises a third output stage coupled to the second output stage, and the third output stage is configured to receive the input signal and output the output signal according to the first comparison signal and the third comparison signal.

18. The low-dropout regulator of claim 17, wherein the third output stage comprises:

a third power transistor comprising a first terminal, a second terminal, and a control terminal, wherein the first terminal receives the input signal, the second terminal outputs the output signal to the first comparator, the second comparator, and the third comparator, and the power transistors comprise the third power transistor; and a second hysteresis controller coupled to the third power transistor and configured to output a third switching signal to the control terminal of the third power transistor according to the first comparison signal and the third comparison signal to control a conduction state of the third power transistor, and the hysteresis controllers comprise the second hysteresis controller.

19. The low-dropout regulator of claim 18, wherein
when the second hysteresis controller receives a rising edge of the first comparison signal or a rising edge of the third comparison signal, the second hysteresis controller outputs the third switching signal at a first level so that the third power transistor is turned on; and
when the second hysteresis controller receives a falling edge of the first comparison signal or a falling edge of the third comparison signal, the second hysteresis controller outputs the third switching signal at a second level so that the third power transistor is turned off.

20. The low-dropout regulator of claim 19, wherein
when the output signal is less than or equal to the third reference signal, the third comparator outputs the third comparison signal at the first level, and when the second hysteresis controller receives a rising edge of the third comparison signal, the second hysteresis controller outputs the third switching signal at the first level to turn on the third power transistor; and
when the output signal is greater than the first reference signal, the first comparator outputs the first comparison signal at the second level, when the second hysteresis controller receives a falling edge of the first comparison signal, the second hysteresis controller outputs the third switching signal at the second level so that the third power transistor is turned off, and the first reference signal is greater than the third reference signal.

* * * * *